(12) United States Patent
Kritt et al.

(10) Patent No.: US 8,407,199 B2
(45) Date of Patent: Mar. 26, 2013

(54) GRAPHIC QUERY SUGGESTION APPARATUS AND PROGRAM PRODUCT

(75) Inventors: Barry Alan Kritt, Raleigh, NC (US); Sarbajit Kumar Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/095,987

(22) Filed: Apr. 28, 2011

(65) Prior Publication Data

US 2012/0278369 A1 Nov. 1, 2012

(51) Int. Cl.
*G06F 7/00* (2006.01)
*G06F 17/30* (2006.01)

(52) U.S. Cl. .................. 707/706; 707/722; 707/769

(58) Field of Classification Search .................. 707/805, 707/706, 722, 723, 752, 769
See application file for complete search history.

(56) References Cited

U.S. PATENT DOCUMENTS

| | | | |
|---|---|---|---|
| 7,555,476 B2 * | 6/2009 | Holbrook | 1/1 |
| 7,676,460 B2 | 3/2010 | Morgan | |
| 7,680,778 B2 | 3/2010 | Middha et al. | |
| 2005/0134578 A1 * | 6/2005 | Chambers et al. | 345/184 |
| 2006/0277167 A1 | 12/2006 | Gross et al. | |
| 2008/0010605 A1 * | 1/2008 | Frank | 715/765 |
| 2009/0019031 A1 * | 1/2009 | Krovitz et al. | 707/5 |
| 2009/0164929 A1 * | 6/2009 | Chen et al. | 715/769 |
| 2009/0327236 A1 | 12/2009 | Denney et al. | |
| 2010/0205202 A1 | 8/2010 | Yang et al. | |

OTHER PUBLICATIONS

Feuer, A.-et al.; "Implementing and Evaluating Phrasal Query Suggestions for Proximity Search"; INSPEC/Elsevier Science Ltd.; vol. 34, No. 8, pp. 712-724; Dec. 2009.
Nandi, A.-et al.; "Assisted Querying Using Instant-Response Interface"; GOOGLE; SIGMOD '07; pp. 1156-1167; Jun. 2007.
Chen, Y.-et al.; "A Personalized Query Suggestion Agent Based on Query-Concept Bipartite Graphs and Concept Relation Trees"; Inderscience Enterprises Ltd.; pp. 1-10; 2008-2009.
Croft, B.-et al.; "Query Representation and Understanding"; GOOGLE/ACM SIGR Conference 2010; Jul. 19-23, 2010.

* cited by examiner

*Primary Examiner* — Merilyn Nguyen
(74) *Attorney, Agent, or Firm* — Steven Bennett; Daniel E. McConnell (57) ABSTRACT

An apparatus and a program product which generates at a user's computer system a display which graphically shows the relationships among a core query and one or more suggested related queries in a search conducted through an online search engine. The display preferably is a set of partially overlapping geometric figures such as circles, with the size of each circle indicating the number of resources found by the search queries and the overlap indicating commonality between a core query and a suggested related query.

17 Claims, 9 Drawing Sheets

GRAPHIC QUERY SUGGESTION APPARATUS AND PROGRAM PRODUCT

FIELD AND BACKGROUND OF INVENTION

The present invention relates generally to the field of displaying results obtained from search engines which locate documents or web sites in a computer network (e.g., a distributed system of computer systems), and in particular, to an apparatus and program product for speeding up a desired search by anticipating a user's request. When a computer system user begins typing a core search query into a search box at many search engines, a drop down list appears under the search box which offers selectable suggestions for related query terms even before entry of the core search term or phrase has finished. The suggestions may also provide alternative URLs for web pages if the user is typing the address of a web page into the search box. Heretofore, such a drop down list has been in text alone and lacked any indication of the number of "finds or "hits" for the suggested related query terms or their actual or potential overlap with the core search query.

Some of the problems with existing displays of suggested related queries include a requirement on the user of selecting only one suggested related query and abandoning the core query in doing so. The user cannot create a customized filter for suggested related queries, such as the Boolean selections of AND, OR, EXCLUDE and so forth. The existing suggestions of related queries give no advance indication of the scope of the results which will be reported should the suggestion be accepted in substitution for the core query.

SUMMARY OF THE INVENTION

What is here taught is an apparatus and a program product which generates at a user's computer system a display which graphically shows the relationships among a core query and one or more suggested related queries. This display preferably is a set of partially overlapping geometric figures such as circles, with the size of each circle indicating the number of resources found by the search query and the overlap indicating commonality between a core query and a suggested related query.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
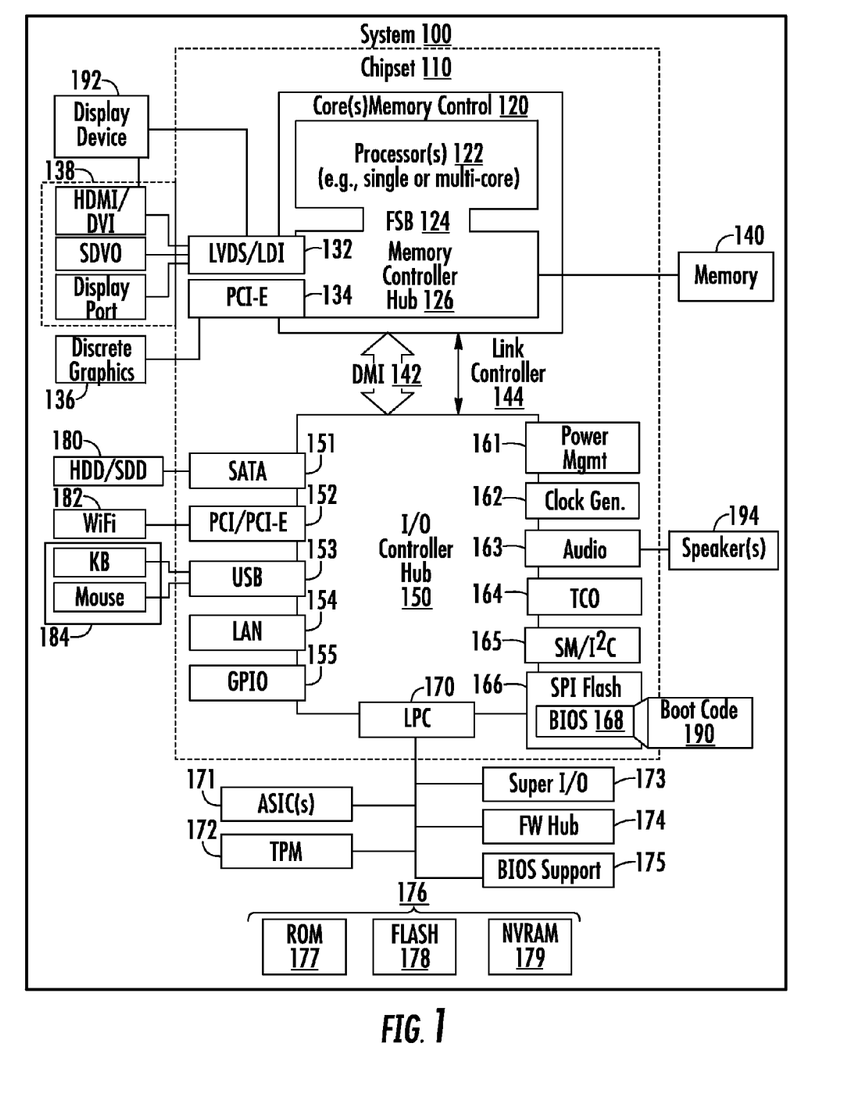
FIG. 1 is an illustration of a computer system such as would be used by a person exercising the invention described here.

While various exemplary circuits or circuitry are discussed, FIG. 1 depicts a block diagram of an illustrative exemplary computer system 100. The system 100 may be a desktop computer system or a workstation computer; however, as apparent from the description herein, a client device, a server or other machine may include other features or only some of the features of the system 100.

The system 100 of FIG. 1 includes a so-called chipset 110 (a group of integrated circuits, or chips, that work together, chipsets) with an architecture that may vary depending on manufacturer (e.g., INTEL®, AMD®, etc.). The architecture of the chipset 110 includes a core and memory control group 120 and an I/O controller hub 150 that exchange information (e.g., data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (e.g., single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (e.g., to provide support for a type of RAM that may be referred to as "system memory"). The memory controller hub 126 further includes a LVDS interface 132 for a display device 192 (e.g., a CRT, a flat panel, a projector, etc.). A block 138 includes some technologies that may be supported via the LVDS interface 132 (e.g., serial digital video, HDMI/DVI, display port). The memory controller hub 126 also includes a PCI-express interface (PCI-E) 134 that may support discrete graphics 136. In FIG. 1, the I/O hub controller 150 includes a SATA interface 151 (e.g., for HDDs, SDDs, etc.), a PCI-E interface 152 (e.g., for wireless connections 182), a USB interface 153 (e.g., for input devices 184 such as keyboard, mice, cameras, phones, storage, etc.), a network interface 154 (e.g., LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (e.g., for speakers 194), a TCO interface 164, a system management bus interface 165, and SPI Flash 166, which can include BIOS 168 and boot code 190. The I/O hub controller 150 may include gigabit Ethernet support.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168. As described herein, a device may include fewer or more features than shown in the system 100 of FIG. 1.

Turning now to FIGS. 2 through 7, what is there illustrated is the display created in response to entry of a core query by a computer system user. In accordance with what is here taught, the response to entry of a core search query into a search program by a computer system user is the by display to the user of a plurality of geometric figures including a core figure (the area 200) representing results delivered by the search program for the core search query and at least one secondary figure (201 through 208) representing results delivered for suggested related queries. The relative sizes of the displayed figures are determined from the number of results delivered by the search program for the core search query and the suggested queries. Should the user point a screen cursor to a displayed figure (200 through 208), the response is a display of the results delivered by the search program for the query represented by the figure to which the cursor points.

Figure 2:
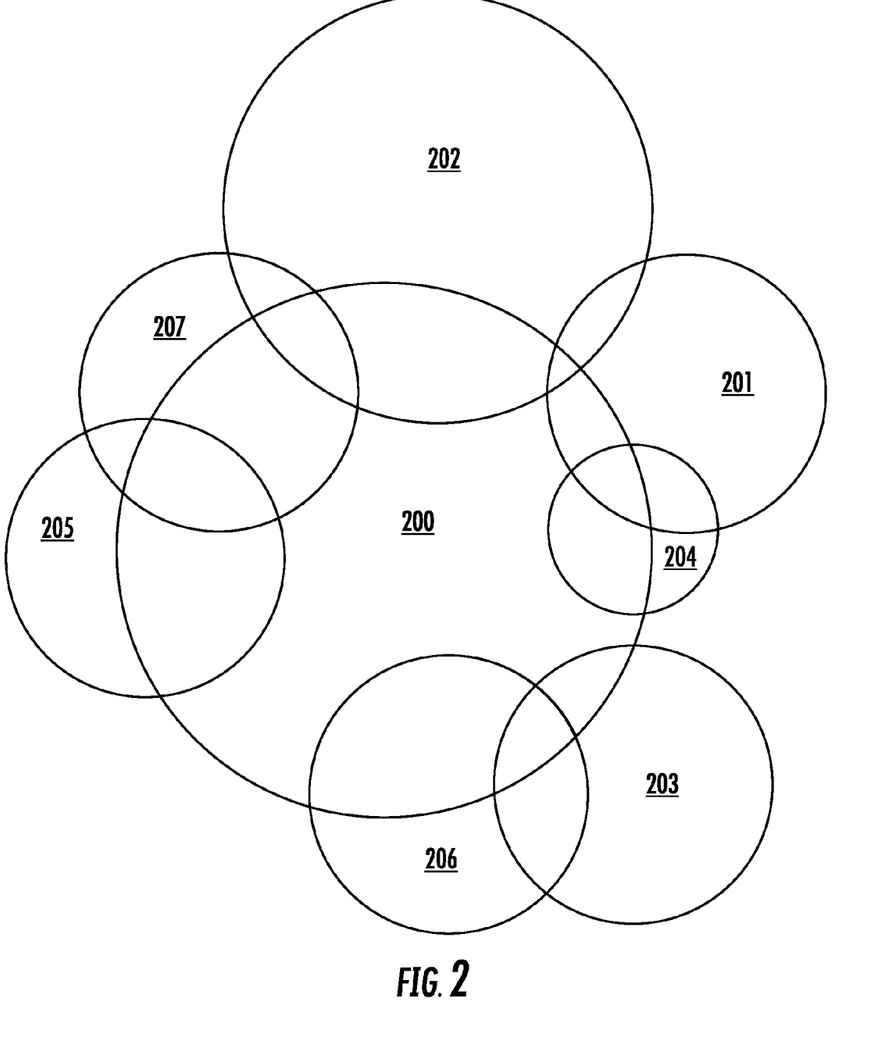
FIG. 2 is an illustration of the display which results from entry by a user of a core search query and the subsequent suggestion of related queries.
Figure 3:
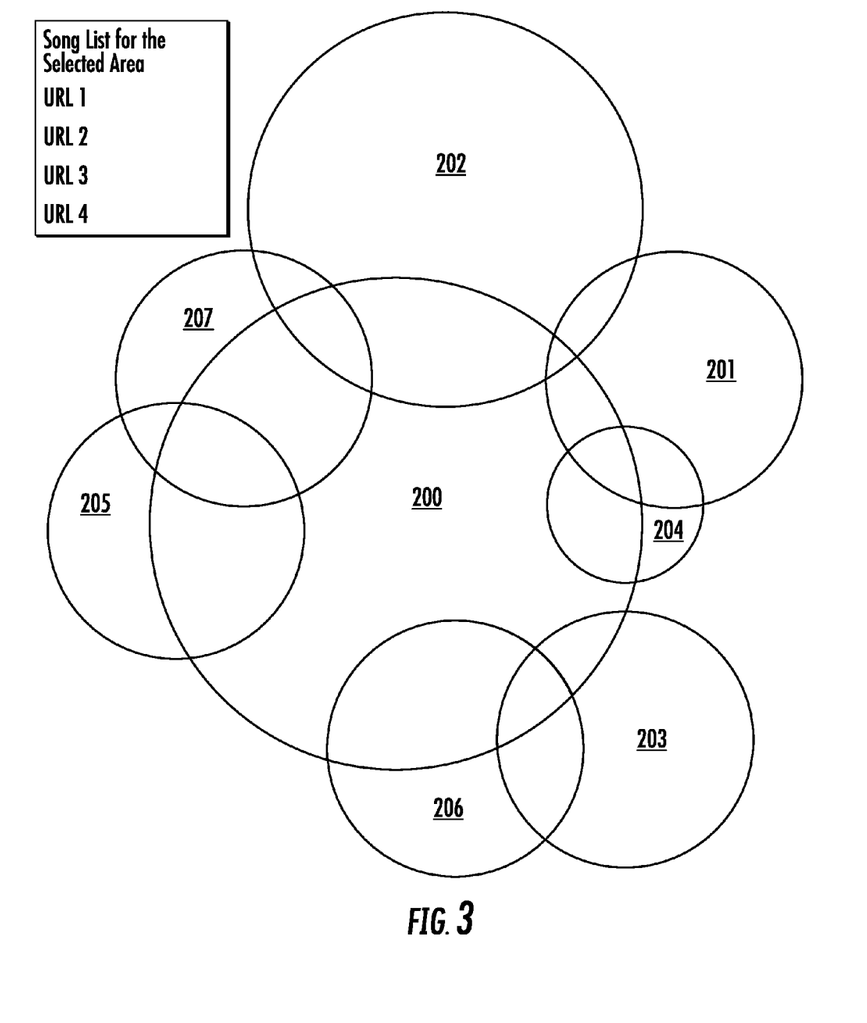
FIG. 3 is an illustration of the display similar to FIG. 2 which follows when a user causes a cursor on the display to hover over an area of the display.

For purposes of this discussion, the core query typed into the search panel displayed by the user's system may be seeking songs by an artist "Kishore kumar and". As this core query is typed, the accessed search service may make suggestions of related queries. Those may include, for illustration purposes, that the next word or phrase following the "and" may be "madhubala" (area 201); "lata mangeshkar" (area 202); "asha bhosle" (area 203); "rajesh khanna" (area 204); "rd burman" (area 205); "mohammad rafi" (area 206); or "live performance" (area 207).

The displayed geometric areas may be circles, as shown, or may be any other desired plane geometric figure such as a rectangular or polygonal shape. The circle is shown only because it may be more pleasing to a user's eye than other possible shapes.

As shown, the displayed figures define areas of overlap within which the results delivered are for the core search query and the suggested query. Further the response to entry of the core search query includes displaying the core query area 200 and a plurality of secondary FIGS. 201 through 207 representing a plurality of suggested related queries. A plurality of areas of overlap appear (core query area 200 overlaps with all of the suggested query areas 201 through 207 and several of the suggested query areas overlap not only the core query area 200 by an another suggested query area) within each of which the results delivered are for the core search query and one or more suggested queries.

Figure 4:
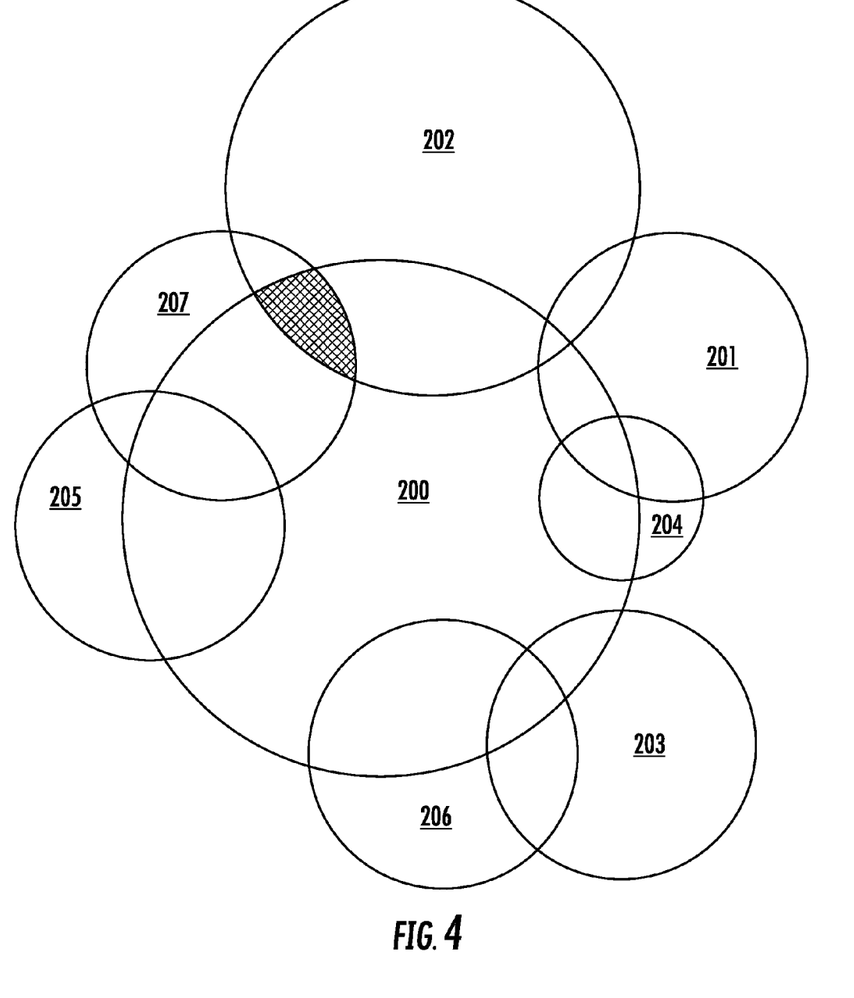
FIG. 4 is an illustration of the display of FIG. 2 which follows when a user chooses to highlight a specific area of overlap between the core query and a suggested query, performing an AND function.
Figure 5:
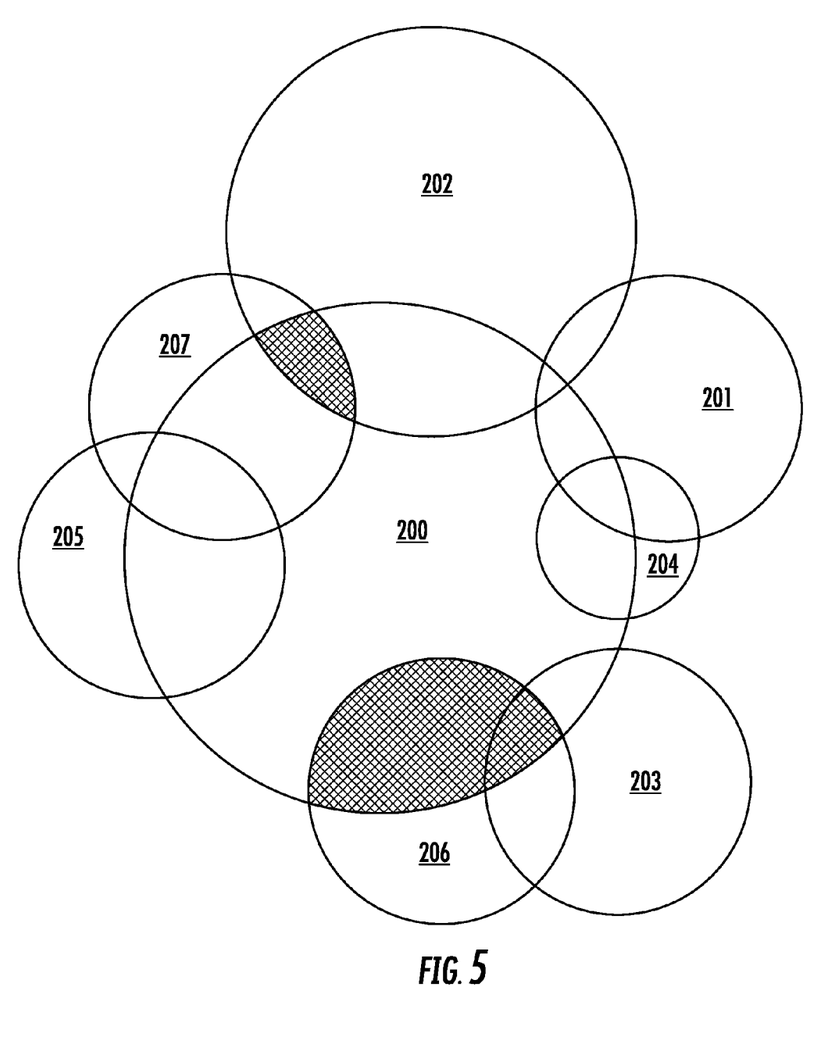
FIG. 5 is an illustration of the display of FIG. 2 which follows when a user chooses to highlight two specific areas of overlap between the core query and two suggested queries, performing an OR function.
Figure 6:
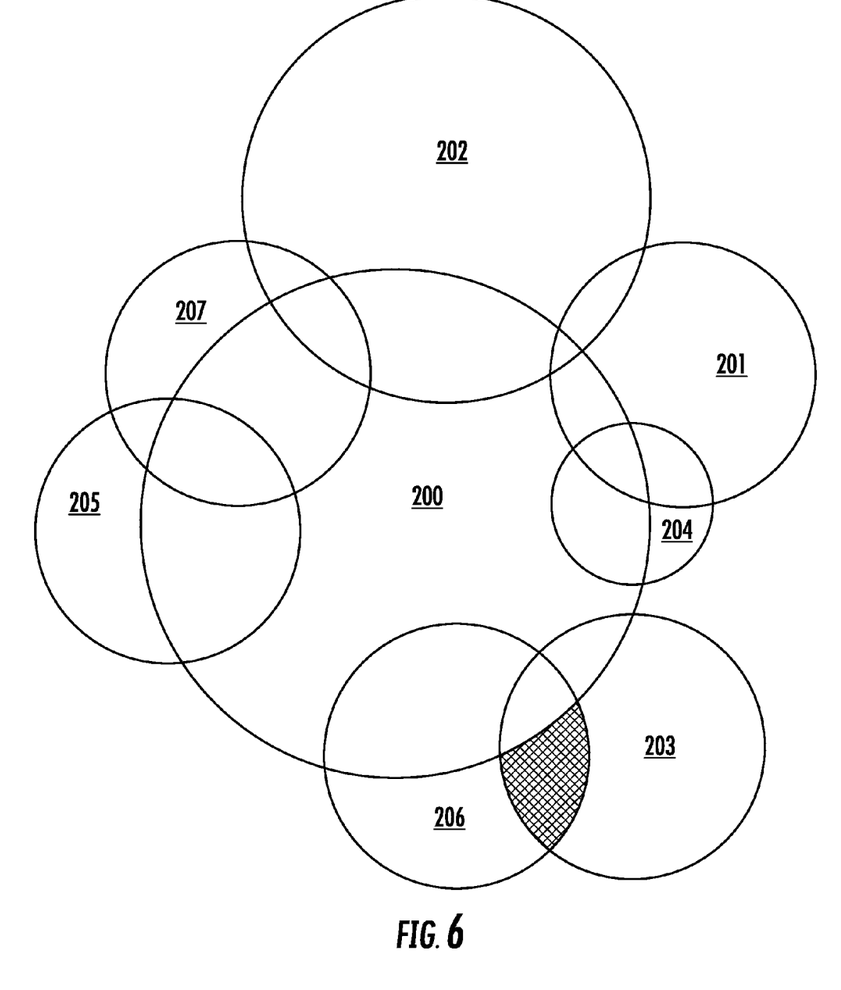
FIG. 6 is an illustration of the display of FIG. 2 which follows when a user chooses to highlight a specific area of overlap between two suggested queries, performing an EXCLUDE function.

Should the system user point a cursor (by using a mouse or other input device) to one of the displayed areas and hover the cursor over the area, then a pop up window 300 (FIG. 3) will appear giving at least the most highly ranked (by the search engine) results for the selected query (if a single one of the area 200 through 207 is selected, here area 200) or combination of queries (if an overlap area such as the overlap of areas 200 and 201 is selected). Where the area over which the cursor is hovered is an overlap area where several of the displayed figures overlap (as the areas 200, 202, 207), the displayed result will be for an "anding" together of the core and two suggested related queries (FIG. 4). As yet another alternative, a user may hold the selection of one area (such as the overlap of area 200, 202, and 207, and also select yet another area such as the overlap of areas 200 and 206 (FIG. 5). This operation results in a displayed of the most highly ranked (by the search engine) of an "oring" together of the core query and three suggested related queries. The user may also decide to focus on one of the areas discovered by the suggested related queries (FIG. 6), as by selecting an area (here, the overlap of areas 206 and 203) which excludes the core enquiry area 200.

Figure 7:
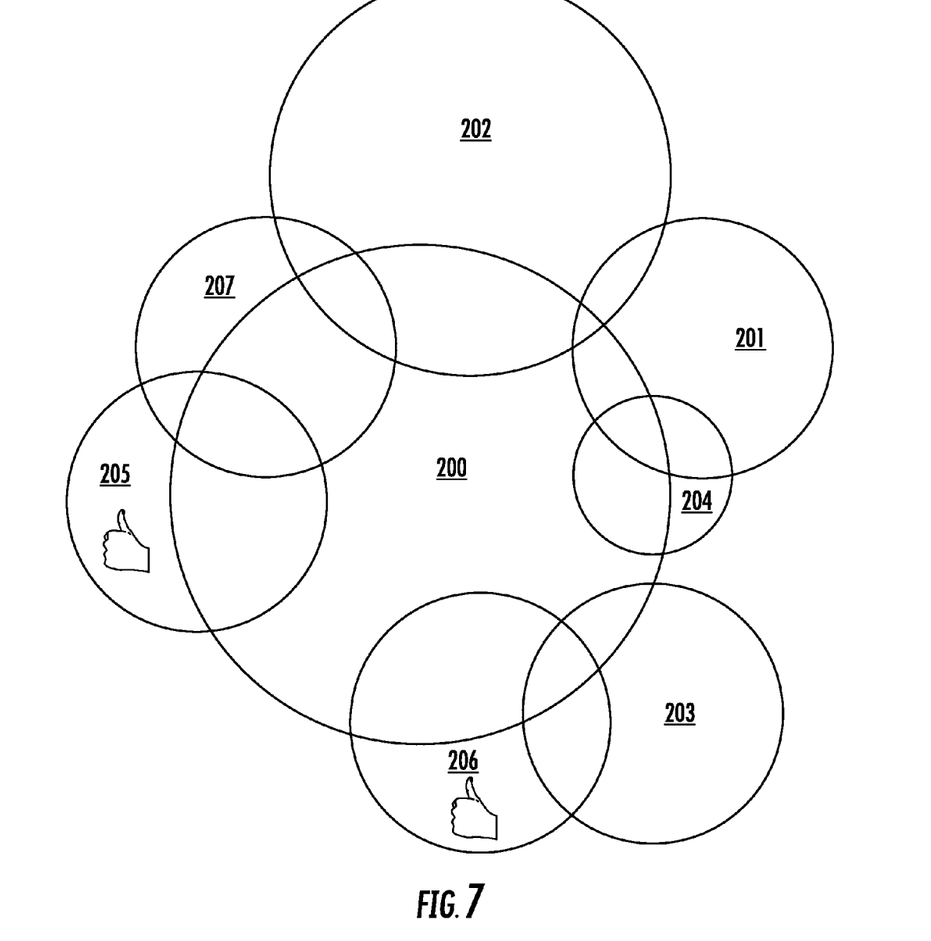
FIG. 7 is an illustration of the display which follows when a user chooses to highlight two specific areas of two suggested queries for linking into a social networking system as recommendations.

Regardless of the area or areas selected, the user may choose to make a recommendation of the search through a social networking program such as facebook, twitter or reddit. Should the user so choose, or should a person linked to the user through social networking have so chosen, then a recommendation icon will be displayed in the relevant areas. In FIG. 7, such a recommendation is indicated by a "thumbs up" icon in areas 205 and 206.

Figure 8:
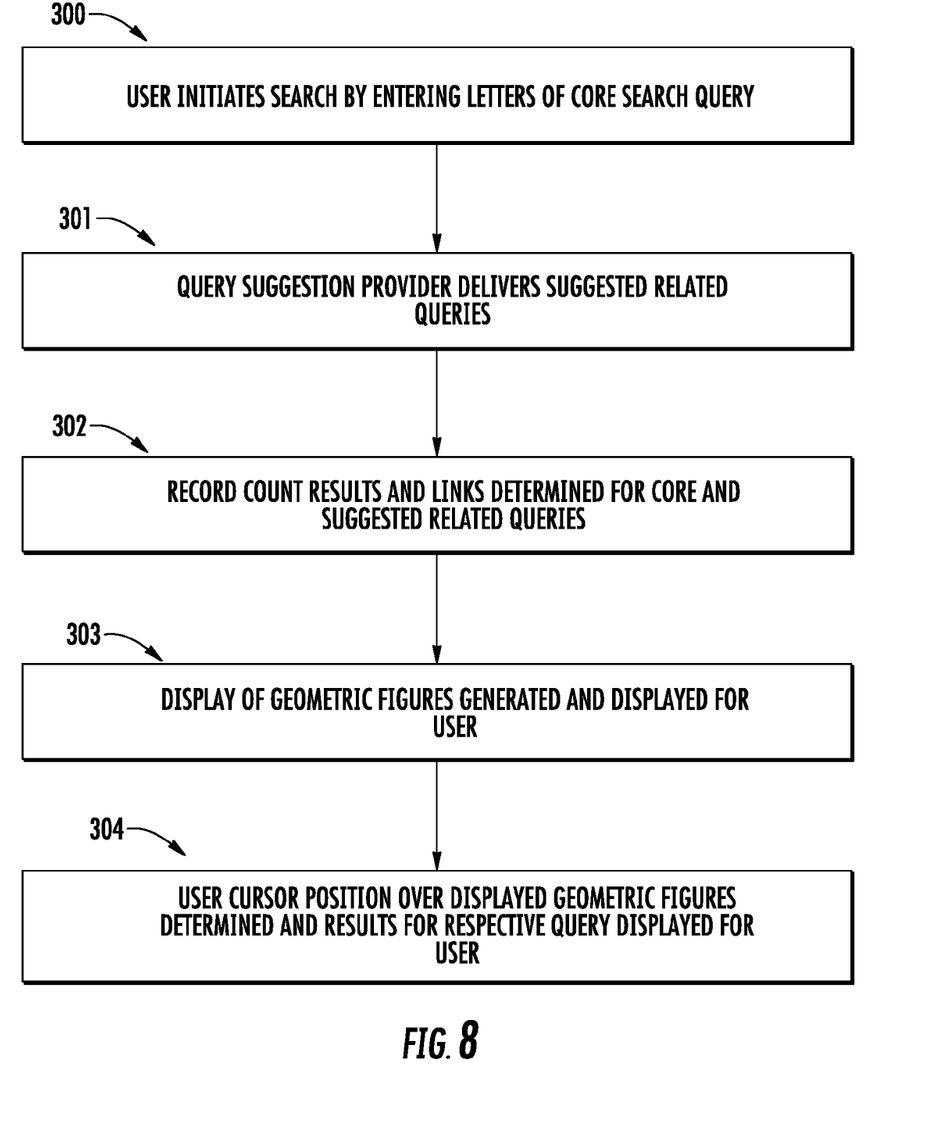
FIG. 8 is a flow chart illustrating elements of the process involved in the present invention.

FIG. 8 illustrates schematically the steps of the process. A user initiates a search by entering characters of what will be the core search request (300). As the characters are entered, a query suggestion provider will generate suggestions for related queries (301). The record count ("hits") and links for those records (typically url addresses) will be determined (302). The geometric figure display will be generated and displayed for the user (303). Then, upon the user hovering the cursor or pointer over any area, of the geometric figures, the results for the respective query or boolean combination of queries will be displayed (304).

Figure 9:
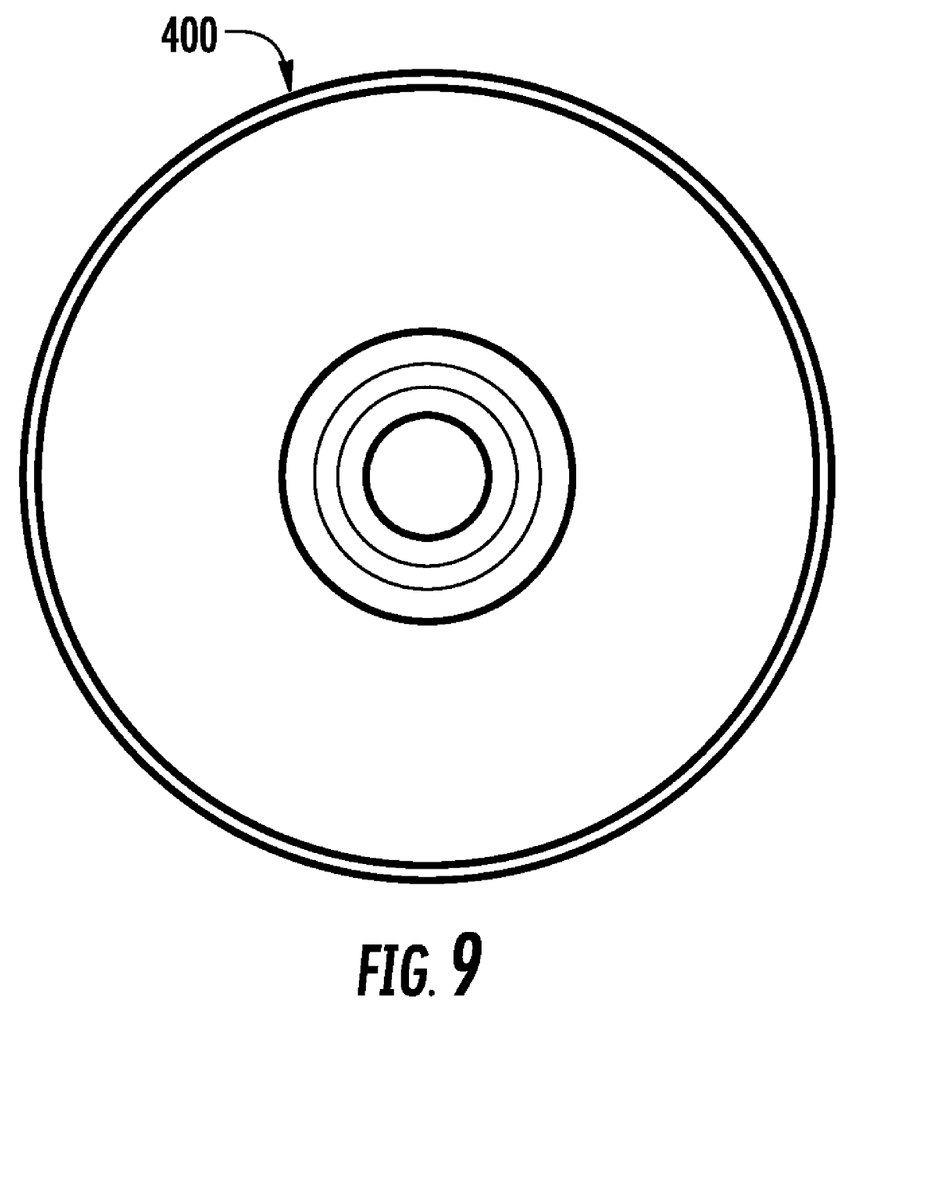
FIG. 9 is a representation of a tangible computer readable storage medium having computer readable program code embodied therewith.

One or more aspects of the present invention can be included in an article of manufacture (e.g., one or more computer program products) having, for instance, non-transistory, tangible computer readable media, indicated at 400 in FIG. 9. The media has embodied therein, for instance, computer readable program code for providing and facilitating the capabilities of the present invention. The article of manufacture can be included as a part of a computer system or sold separately. Machine readable storage mediums may include fixed hard drives, optical discs such as the disc 400, magnetic tapes, semiconductor memories such as read only memories (ROMs), programmable memories (PROMs of various types), flash memory, etc. The article containing this computer readable code is utilized by executing the code directly from the storage device, or by copying the code from one storage device to another storage device, or by transmitting the code on a network for remote execution.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
    a computer system having a processor and memory;

computer instructions stored in said memory accessibly to said processor and effective when executing on said processor to:

respond to entry of a core search query into a search program by a computer system user by displaying to the user a plurality of geometric figures including a core figure representing a number of results delivered by the search program for the core search query and a secondary figure representing a number of results delivered for a suggested related query;

display the displayed figures in varying relative sizes determined by the number of results delivered by the search program for the core search query and the number of results delivered by the search program for the suggested query, with a larger sized display indicating a larger number of results; and respond to the system user pointing a screen cursor to a displayed figure by displaying the results delivered by the search program for whichever of the queries is represented by the figure to which the cursor points.

2. Apparatus according to claim 1 wherein the displayed geometric figures are circles.

3. Apparatus according to claim 1 wherein the displayed figures define areas of overlap within which the results delivered are for the core search query and the suggested query.

4. Apparatus according to claim 1 wherein the response to entry of the search query includes displaying a plurality of secondary figures representing a plurality of suggested related queries.

5. Apparatus according to claim 4 wherein the displayed figures define a plurality of areas of overlap within each of which the results delivered are for the core search query and a suggested query.

6. Apparatus according to claim 5 further comprising said instructions when executing on said processor being effective to respond to the system user pointing a screen cursor to an area of overlap by displaying results delivered by the search program for the queries represented by the area to which the cursor points.

7. Apparatus according to claim 5 further comprising said instructions when executing on said processor being effective to respond to the system user pointing a screen cursor to a plurality of selected areas of overlap by displaying results delivered by the search program for the alternative queries represented by the areas selected.

8. Apparatus according to claim 5 further comprising said instructions when executing on said processor being effective to respond to the system user pointing a screen cursor to an area of overlap outside of the core query figure by displaying results delivered by the search program which exclude the core query.

9. Apparatus according to claim 1 further comprising said instructions when executing on said processor enabling the system user to identify search query results as recommendations to social networking programs.

10. A computer program product for displaying search results, the computer program product comprising:

a non-transistory, tangible computer readable storage medium having computer readable program code embodied therewith, the computer readable program code comprising:

computer readable program code configured to:

respond to entry of a core search query into a search program by a computer system user by displaying to the user a plurality of geometric figures including a core figure representing a number of results delivered by the search program for the core search query and a secondary figure representing a number of results delivered for a suggested related query;

display the displayed figures in varying relative sizes determined by the number of results delivered by the search program for the core search query and the number of results delivered by the search program for the suggested query, with a larger sized display indicating a larger number of results; and respond to the system user pointing a screen cursor to a displayed figure by displaying the results delivered by the search program for whichever of the queries is represented by the figure to which the cursor points.

11. A computer program product according to claim 10 wherein the response to entry of the search query includes displaying a plurality of secondary figures representing a plurality of suggested related queries.

12. A computer program product according to claim 11 wherein the displayed figures define a plurality of areas of overlap within each of which the results delivered are for the core search query and a suggested query.

13. A computer program product according to claim 12 wherein the response to the system user pointing a screen cursor to an area of overlap includes displaying results delivered by the search program for the queries represented by the area to which the cursor points.

14. A computer program product according to claim 12 wherein the response to the system user pointing a screen cursor to a plurality of selected areas of overlap includes displaying results delivered by the search program for the alternative queries represented by the areas selected.

15. A computer program product according to claim 12 wherein the response to the system user pointing a screen cursor to an area of overlap outside of the core query figure includes displaying results delivered by the search program which exclude the core query.

16. A computer program product according to claim 10 wherein the displayed geometric figures are circles.

17. A computer program product according to claim 16 wherein the displayed figures define areas of overlap within which the results delivered are for the core search query and the suggested query.

\* \* \* \* \*